United States Patent
Missbach et al.

(10) Patent No.: US 10,102,814 B2
(45) Date of Patent: Oct. 16, 2018

(54) CONTROLLABLE DEVICE FOR PHASE MODULATION OF COHERENT LIGHT

(71) Applicants: SEEREAL TECHNOLOGIES S.A., Munsbach (LU); SHARP CORPORATION, Osaka (JP)

(72) Inventors: Robert Missbach, Kreischa/ot Baerenkaluse (DE); Stephan Reichelt, Dresden (DE); Norbert Leister, Dresden (DE); Ralf Haussler, Dresden (DE); Naru Usukura, Osaka (JP); Hiromi Katoh, Osaka (JP); Yuichi Kanbayashi, Osaka (JP)

(73) Assignees: SEEREAL TECHNOLOGIES S.A., Munsbach (LU); SHARP CORPORATION, Osaka (JP)

( * ) Notice: Subject to any disclaimer, the term of this patent is extended or adjusted under 35 U.S.C. 154(b) by 377 days.

(21) Appl. No.: 14/430,259

(22) PCT Filed: Oct. 1, 2012

(86) PCT No.: PCT/EP2012/069383
§ 371 (c)(1),
(2) Date: Mar. 23, 2015

(87) PCT Pub. No.: WO2014/053164
PCT Pub. Date: Apr. 10, 2014

(65) Prior Publication Data
US 2015/0279293 A1    Oct. 1, 2015

(51) Int. Cl.
*G09G 3/36* (2006.01)
*G09G 3/00* (2006.01)
*G03H 1/22* (2006.01)

(52) U.S. Cl.
CPC ........... *G09G 3/3614* (2013.01); *G09G 3/006* (2013.01); *G03H 1/2294* (2013.01);
(Continued)

(58) Field of Classification Search
CPC ......... G09G 2300/0823; G09G 3/3614; G03H 2001/0458; G03H 1/2294; G03H 2001/0224
(Continued)

(56) References Cited

U.S. PATENT DOCUMENTS

| | | | |
|---|---|---|---|
| 2006/0139711 A1* | 6/2006 | Leister | G03H 1/0808 359/9 |
| 2007/0075956 A1* | 4/2007 | Satou | G09G 3/3614 345/98 |

(Continued)

OTHER PUBLICATIONS

International Search Report dated Aug. 26, 2013, and Written Opinion issued in priority International Application No. PCT/EP2012/069383.

*Primary Examiner* — Priyank Shah
(74) *Attorney, Agent, or Firm* — Saul Ewing Arnstein & Lehr LLP

(57) ABSTRACT

A controllable device for phase modulation of coherent light comprises a modulator matrix having a plurality of liquid crystal modulator cells each being adapted to modulate a phase value of light passing through a liquid crystal modulator cell depending on a voltage, which is applied to the liquid crystal modulator cell; at least one polarity area of said modulator matrix including at least one liquid crystal modulator cell; at least one storage unit for storing at least one pair of voltage values of which one has a positive and the other has a negative polarity for the liquid crystal modulator cells, whereby the pair of voltage values corresponds to a predetermined phase value; and a control unit for selectively applying one pair of voltage values to one liquid crystal modulator cell.

10 Claims, 5 Drawing Sheets

(52) U.S. Cl.
CPC ..... *G03H 2225/32* (2013.01); *G09G 2320/02* (2013.01); *G09G 2320/0214* (2013.01)

(58) Field of Classification Search
USPC .......................................................... 349/37
See application file for complete search history.

(56) References Cited

U.S. PATENT DOCUMENTS

2009/0284671 A1    11/2009  Leister
2013/0176167 A1*    7/2013  Bergeron ............ G01S 13/9005
                                                342/25 F

* cited by examiner

CONTROLLABLE DEVICE FOR PHASE MODULATION OF COHERENT LIGHT

CROSS REFERENCE TO RELATED APPLICATIONS

This application claims the priority of PCT/EP2012/069383, flied on Oct 1, 2012, the entire contents of which is incorporated fully herein by reference.

The present invention relates to a controllable device for phase modulation of coherent light with a spatial light modulator device for generating a light distribution. Thereby, the controllable device comprises a modulator matrix having a plurality of liquid crystal (LC) modulator cells each being adapted to modulate a phase value of light passing through said liquid crystal modulator cell depending on a voltage which is applied to said liquid crystal modulator cell, and at least one polarity area of said modulator matrix including at least one liquid crystal modulator cell.

A liquid crystal display might be used as a spatial light modulator device in accordance to the present invention and therefore, a liquid crystal display (LCD) is used as a synonym for a spatial light modulator device or just a spatial light modulator (SLM) throughout this document. A modulator matrix can be regarded as a part of the spatial light modulator device which is suitable to modulate the light interacting with the spatial light modulator device, the modulation of light is effected by the plurality of liquid crystal modulator cells of the modulator matrix. Liquid crystal displays are generally known which are adapted to modulate the amplitude or the phase of a light distribution being emitted e.g. by a backlight illumination unit of a display device to display image content to one or more observers. Furthermore, a spatial light modulator device according to the present invention might be operated in transmissive, reflective or transflective mode. It might be possible to illuminate the spatial light modulator device with an illumination device as it is explained e.g. in WO 2010/149583 A1, wherein the illumination device illuminates the spatial light modulator device from the same side from which the observer is looking to the spatial light modulator device (front-light illumination device).

When driving conventional nematic liquid crystal displays for amplitude modulation, DC voltages have to be avoided since DC voltages lead to effects like image sticking and potentially chemical degradation of the liquid crystal material. Therefore, the sign or polarity of the driving voltage for each pixel is changed after a predetermined time interval. For a nematic liquid crystal with dielectric coupling to the applied field, the liquid crystal orientation and the related optical response depends only on the absolute voltage but not on the sign of voltage. Consequently, in an ideal case, the optical response of a pixel is identical if a positive voltage and/or negative voltage is applied (as long as the absolute value of voltage is not changed). A liquid crystal display typically includes a common electrode on one substrate and pixel electrodes on a second substrate. The inversion of the voltage sign may for example be done by shifting the voltage level of the common electrode after a certain while. The voltage acting on the pixel is the relative voltage between the voltage level of common electrode and the pixel electrode. For example, the pixel electrode voltage level may be fixed to 3 V but the common electrode voltage level may change from 0 V for a first time frame to 6 V for a second time frame. Then the voltage applied to the pixel changes from +3 V to −3V.

In the field of active matrix driving of liquid crystal displays modulating the light amplitude, different inversion schemes are known. For example, in case of line or row inversion, even pixel lines or rows are driven with a positive voltage and odd lines or rows are driven with a negative voltage in the first time frame. In contrast, even pixel lines or rows are driven with a negative voltage and odd lines or rows are driven with a positive voltage in the second time frame. Moreover, a chess-board pattern of positive and negative driving voltages is used in a dot inversion scheme.

Said inversion schemes are used in amplitude modulating liquid crystal displays in order to avoid for example flicker effects, which result from voltage offsets in different time frames. However, in general, capacitive crosstalk and leakage currents in TFT based liquid crystal displays may still occur and may lead to additional artefacts, for example luminance gradients in different areas of a liquid crystal display.

Concerning phase modulating liquid crystal displays, said displays exist for applications like laser beam shaping. In the past, mainly LCoS devices (Liquid Crystal on Silicon) were developed for phase modulation as spatial light modulators comprising a small cross section area is sufficient for laser applications.

However, concerning TFT based phase modulating liquid crystal displays, voltage offsets may lead to unwanted phase shifts even if the above-discussed line or row inversion schemes are applied.

In such a phase modulating liquid crystal display, for example lens functions or prism functions may be encoded by the relative phase distribution over some number of pixels. Then the relative phase modulation of neighbouring pixel is more important than the absolute phase modulation of a single pixel. In case of a lens function encoded in the phase display, a common shift of the phase value of all pixels in the same direction is similar to slightly changing the absolute thickness of the lens but keeping the shape of the lens surface fixed. The focusing function of the lens is then unaffected by the shift. If, however, neighbouring pixels get a phase offset in different directions due to possible driving voltage offsets, the shape of the lens may be changed which potentially degrades its focusing capability. Line inversion and dot inversion schemes will therefore change the relative phase of neighbouring pixel and therefore affect encoded lens and prism functions in a negative way.

For example, prior art document WO 2010/149588 describes the combination of light coming from two phase pixels of a phase SLM to one complex pixel with a beam combiner. Thereby, two phase values are encoded such that their sum leads to a complex value:

$$\frac{1}{2}\exp(i\phi_1) + \frac{1}{2}\exp(i\phi_2) = \cos\left(\frac{\phi_1 - \phi_2}{2}\right) \cdot \exp\left(i\frac{\phi_1 + \phi_2}{2}\right),$$

whereby the amplitude is proportional to the difference of both phase values and the phase is proportional to the sum of both phase values.

In case of a line or dot inversion scheme, a DC offset shifts the phase value of the first pixel to $\phi_1 + \Delta\phi$ and the phase value of the second pixel in the opposite direction to $\phi_2 - \Delta\phi$, whereby the simplified assumption is made that the absolute value of the phase shift is the same for both pixel. Consequently, the amplitude changes to $$\cos\left(\frac{\phi_1 + \phi_2 + 2\Delta\phi}{2}\right).$$

For a complex valued pixel, the complex data may be for example the result of several overlapping lens functions, which are encoded on a holographic display. However, said amplitude change does negatively affect the 3D scene reconstruction in case of a line or dot inversion scheme in a beam combiner.

Moreover, a similar problem occurs in a conventional spatial light modulator device for modulating the phase of coherent light, which is driven by a row inversion scheme. If a phase offset $\Delta\phi$ is added to the nominal phase values in every second row of a display matrix due to voltage offsets or leakage currents during row inversion, the reconstruction of the 3D scene is incorrect and noisy since the relative phase difference between neighbouring pixels is incorrect. This phenomenon is shown in FIGS. 1A and 1B: FIG. 1A shows the desired and ideal nominal phase values for pixels of a spatial light modulator device, which is driven in a row inversion scheme. In contrast, FIG. 1B shows the realistic phase values for pixels of a spatial light modulator device which is driven in a row inversion scheme and a phase offset is added to the nominal phase values in every second row of the display matrix. As can be seen from FIG. 1B, the reconstruction is incorrect due to the incorrect relative phase difference between neighbouring pixels.

It is therefore an object of the present invention to provide and further develop a controllable device for phase modulation of coherent light with a spatial light modulator device for generating a light distribution, a method for calibration of such a controllable device, a display and a method for displaying two- and/or three-dimensional image content or image sequences of the above-mentioned type which overcome or reduce at least one of the afore-mentioned problems.

Regarding the controllable device for phase modulation, the object of this invention is solved by the teachings of the appended independent claim. Further preferred embodiments and enhancements of the present invention are defined in the dependent claims.

According to one embodiment there is provided a controllable device for phase modulation of coherent light with a spatial light modulator device for generating a light distribution, comprising: a modulator matrix having a plurality of liquid crystal modulator cells each being adapted to modulate a phase value of light passing through said liquid crystal modulator cell depending on a voltage, which is applied to said liquid crystal modulator cell, at least one polarity area of said modulator matrix including at least one liquid crystal modulator cell; at least one storage unit for storing at least one pair of voltage values of which one has a positive and the other has a negative polarity for said liquid crystal modulator cells, whereby said pair of voltage values corresponds to a predetermined phase value; and a control unit for selectively applying one pair of voltage values to one liquid crystal modulator cell, whereby said control unit is adapted to apply alternately said voltage values of positive or negative polarity according to an inversion scheme such that voltages applied to one polarity area have the same polarity.

Consequently, the controllable device according to the present invention can be driven by alternating voltages of different polarities in variable inversion schemes determined by the polarity areas. However, the generated phase values in the liquid crystal modulator cells are not dependent on the polarity of the applied voltages, since of the predetermined voltage pairs, as stored in the storage unit, each comprising of one predetermined voltage value of positive polarity and another predetermined voltage value of negative polarity, each pair generates the same distinct phase value in said liquid crystal modulator cell. Consequently, distinct phase values between neighbouring liquid crystal modulator cells can be applied, which are independent of voltage polarities. Thus, disturbing or unwanted phase offsets between neighbouring liquid crystal modulator cells due to voltage offsets or leakage currents may be reduced or prevented.

Thereby, it has to be noted that the absolute values of the positive and negative voltages stored in the storage unit may be different for a distinct phase value. Moreover, a liquid crystal modulator cell may be understood as a single pixel or a plurality of pixels.

In a preferred embodiment of the present invention, the storage unit is adapted to store pairs of voltage values for distinct phase values or for a predetermined phase interval with distinct phase values. Thus, it is possible to determine in advance a plurality of desired or predetermined phase values, for example according to a desired or predetermined bit depth, and to assign to each distinct phase value one pair of positive and negative voltage values. Moreover, these distinct phase values may for example be equally spaced with a predetermined phase interval. A preferable phase interval may be for example 0 to m·$2\pi$ with m being a real number. Thereby, the distinct phase values may be assigned to specific liquid crystal modulator cells or polarity areas.

In another embodiment of the present invention, the size of the polarity areas is predetermined in advance according to a display type, in which the controllable device is included. Generally, the distance between a computer display and an observer is different from the distance between a television display and an observer. Thus, the sizes of polarity areas, in which voltages of the same polarity are applied to the liquid crystal modulator cells, may be larger in television displays than in computer displays or mobile telephone displays etc. This is especially true for 3D holographic displays, as disclosed e.g. in WO 2006/066919 A1, which apply sub-holograms and wherein the size and position of such a sub-hologram on the modulator matrix depends on the current position of the eyes of the observer as well as on the position of an object point to be generated by this sub-hologram with the 3D holographic display. Thereby, the size and the number of polarity areas can be optimized according to the display type, whereby sharp images are still presented to the observer. Consequently, computing power, necessary storage space or the like may be reduced.

In another preferred embodiment of the present invention, the control unit is further adapted to dynamically adjust said polarity area size and/or a polarity area position and/or a polarity area shape according to the light distribution to be generated by the controllable device and/or the three-dimensional image content to be displayed. Thus, it is possible to adapt the polarity areas and their positions according to the actual 3D image scene, which might depend on the sub-hologram distribution on the modulator matrix in dependence with the actual observer eye position and the objects or 3D scene to be displayed. This feature provides effective inversion schemes for display driving, whereby computing power, necessary storage space or the like may be reduced dynamically according to the actual image content. Nevertheless, a sharp and correctly reconstructed 3D image scene can be provided due to generated phase values being independent of voltage polarities and due to driving schemes for arbitrary sizes and positions of polarity areas.

According to another embodiment, the the light distribution or the three-dimensional image content is defined by at least one sub-hologram and the control unit is adapted to adjust the polarity area size and/or a polarity area position and/or a polarity area shape such that the length of intersection lines between different polarity areas, in which one sub-hologram is generated, is minimized. Thereby, the maximum size of a sub-hologram corresponds as in classic holography to the modulator matrix size, which is defined by the display size. Since length of intersection lines is minimal, the image quality of the reconstructed 3D image scene can be further improved since a sub-hologram is generated by a minimum number of polarity areas. In particular, the control unit is further adapted to adjust the polarity area size and/or a polarity area position and/or a polarity area shape such that one sub-hologram is generated within one single polarity area. Thereby, it is imaginable that different sub-holograms are generated by different polarity areas on the modulator matrix, especially in a dynamic manner.

According to another embodiment of the present invention, the control unit is adapted to apply said pairs of voltage values to said liquid crystal modulator cells according to at least one of a line inversion scheme, a row inversion scheme, a dot inversion scheme, a chess-board inversion scheme, an arbitrary patterned inversion scheme and a frame inversion scheme for said polarity areas. Thus, it is possible to arrange and drive said polarity areas according to these inversion scheme in order to further enhance the quality of the generated light distribution or the image or the reconstruction of a 3D scene.

In a preferred embodiment of the present invention, said one pair of voltage values for one phase value is predetermined in advance for a single liquid crystal modulator cell or one polarity area including a plurality of liquid crystal modulator cells in dependence on at least one of the polarity of the voltage value, the absolute value of the voltage, the size of the polarity area, the position of the liquid crystal modulator cell or the polarity area in the modulator matrix, and the time frame of the nominal phase value. Thus, it is possible to determine and store—e.g. in a storage unit—in advance for arbitrary liquid crystal modulator cells, polarity areas and driving schemes the corresponding pairs of voltage values of positive and negative polarity for distinct phase values to be generated.

According to a further embodiment, the controllable device comprises a plurality of storage units for selectively storing voltage values for at least one positive polarity, negative polarity, a liquid crystal modulator cell and a polarity area. Thus, respective voltage values can be stored in individual storage units, in particular in the form of look-up tables.

In a preferred embodiment, the controllable device further comprises an illumination unit for illuminating the spatial light modulator device with light emitted by the illumination unit. The illumination unit comprises a pulsed illumination or a predetermined illumination function. Such a predetermined illumination function could be realized such that the illumination unit emits light such that particular positions or areas of the spatial light modulator device are illuminated as a function of time and/or such that the illumination unit emits light having a variable intensity as a function of time. The pulsed illumination or the predetermined illumination function of the illumination unit is synchronized with the operation of the spatial light modulator device or with the inversion scheme of the spatial light modulator device.

Therefore, the illumination unit can be controlled such that the spatial light modulator device is illuminated only during a time frame or a duty cycle of the pulsed illumination where the liquid crystal molecules of the spatial light modulator device have approached their final orientations or orientations which are close enough to the final orientations—e.g. within a required bit depth—which determine the nominal phase value which is to be applied by the control unit.

Regarding a display, the object mentioned above is solved by the teaching of the claim. Accordingly, a display comprises a spatial light modulator device and at least one controllable device according to the appended claims. The display is designed such that two-dimensional image content and/or stereoscopic image content and/or stereoscopic multi-view image content and/or holographic image content is presentable.

Regarding a method for operating a controllable device, the object mentioned above is solved by the teaching of the appended claims. Accordingly, the control unit selectively applies one pair of voltage values to one liquid crystal modulator cell, whereby said control unit applies alternately said voltage values of positive or negative polarity according to an inversion scheme such that voltages applied to one polarity area have the same polarity.

In general, it is necessary to calibrate a phase modulating spatial light modulator device according to the concept of the present invention, because of the problems mentioned above regarding the inversion scheme of the phase modulating spatial light modulator device. Therefore, there is provided a method for calibration of a controllable device for phase modulation of coherent light with a spatial light modulator device preferably according to one of the appended claims for generating a light distribution, whereby said controllable device comprises liquid crystal modulator cells arranged on a modulation matrix for modulating the phase of light passing through said liquid crystal modulator cells, comprising the steps of: applying voltages of negative and positive polarity to at least one liquid crystal modulator cell or at least one polarity area comprising a plurality of liquid crystal cells; measuring the phase shift for positive and negative voltages of said liquid crystal modulator cell or said polarity area; generating a set of applied voltage values in dependence on the measured phase shift for positive and negative polarity, respectively; determining a phase interval, in which said sets can be fitted by an analytic function or by a polynomial fit; determining the voltage values of positive and negative polarity for—preferably equally spaced—phase shift values within said interval; and storing said voltages values of positive and negative polarity determined from said fitted functions.

By determining said set of applied voltage values, preferably a pair of voltage values of positive and negative polarity, for a distinct phase shift value, it is possible to prevent unwanted phase offsets due to voltage offsets, leakage currents etc. when generating said distinct phase shift value by a liquid crystal modulator cell and driving the controllable device with an inversion scheme. It is has to be noted that the terms "phase shift value" and "phase value" are used synonymously through the present invention and characterize the shifted phase value of the coherent light modulated by the liquid crystal modulator cells.

In particular, the phase interval is a phase range of $\phi_2-\phi_1=m\cdot2\pi$, m being a real number. This enables for example a phase range of 0 to $2\pi$ for distinct phase shift values. Moreover, it is desirable to determine said phase shift values in said phase interval for all desired wavelengths of the light which is used to illuminate the controllable device and/or the spatial light modulator device.

In order to further control and improve the resulting phase shifts, the method according to the present invention may further comprise the step of re-applying the stored voltage values for determination of the calibration accuracy. Thus, the calibration procedure may be repeated if necessary.

According to another embodiment, the voltages values of positive and negative polarity determined from said fitted functions are further assigned to certain phase shift values. This enables e.g. assigning phase shift values to interpolated and/or measured phase shift values.

According to a preferred embodiment, the calibration method—but also, as mentioned above, the operation of a controllable device or a phase modulating spatial light modulator device in accordance with the present invention—further comprises the step of synchronizing a backlight illumination of the spatial light modulator device and a phase shift measuring sensor such that the backlight illumination illuminates the spatial light modulator device only during the time frame where liquid crystal molecules have approached their final orientations within a required bit depth, which determine the nominal phase value. Thus, the backlight illumination may already be switched on if for example 98%, 99.5% or 99.99% of the nominal phase value has been reached. Thus, it is ensured that the calibration is mainly accomplished within a time frame, in which the liquid crystal molecules have converged in their final orientations. Phase shift measurement sensors may comprise sensors using intensity based measurement methods (for example photodiodes) and/or phase-based interferometry methods (for example Twyman-Green or Mach-Zehnder interferometry and imaging the spatial light modulator on a CCD). Concerning intensity based measurement methods, a phase modulating spatial light modulator device is placed between two orthogonal polarizers. Then, the resulting intensity is measured, which may be used to determine the phase shift. Concerning phase-based interferometry methods, the phase difference between a modulated area and a non-modulated area on a phase modulating spatial light modulator is determined, for example via cross-correlation of the resulting interferograms of both areas.

In another embodiment, the method for calibration further comprises the step of spatially arranging at least one phase shift measuring sensor at positions being suitable to measure the phase shift of said liquid crystal modulator cells or said polarity areas. Thus, it is possible to adjust the measuring sensor according to positions of liquid crystal modulator cells or polarity areas of the liquid crystal modulator matrix, in which the voltage dependent phase responses are to be measured. In particular, the method for calibration further comprises the step of synchronizing the phase shift measuring sensor according to an inversion scheme applied to said liquid crystal modulator cells or said polarity areas.

There are a number of possibilities for embodying and continuing the teachings of the present invention. To this end, reference is made on the one hand to the appended claims, and on the other hand to the description of the preferred embodiments of this invention below including the accompanying drawings. Generally, preferred physical forms and continuations of the teaching will be explained in conjunction with the description of the preferred embodiments of the invention and the accompanying drawings. The figures are schematic drawings, where FIG. 1A shows a desired nominal phase distribution of a liquid crystal modulator matrix driven by a row inversion scheme;

Figure 1A:
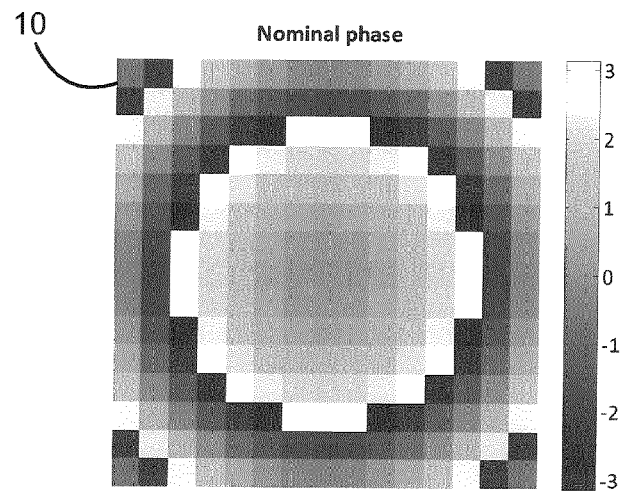
FIG. 1B shows the achieved noisy phase distribution of a liquid crystal modulator matrix of the prior art driven by a row inversion scheme, whereby phase offsets occur.
Figure 1B:
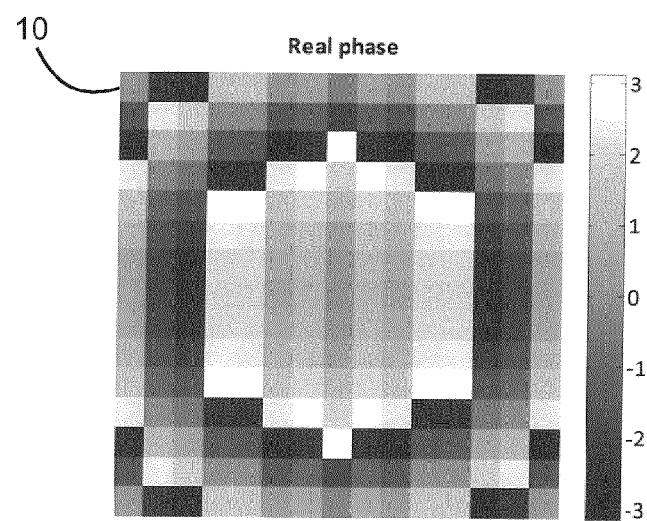
Figure 2A:
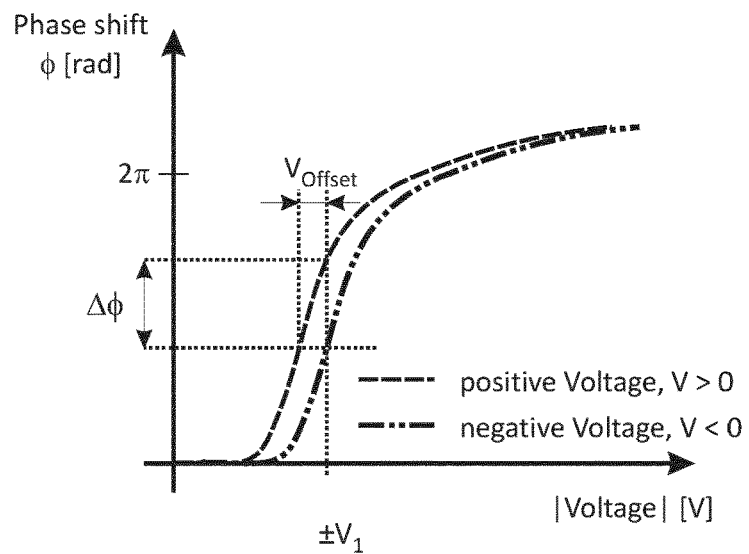
FIGS. 2A to 2C show graphs illustrating the method for calibration of a controllable device according to the present invention.
Figure 2B:
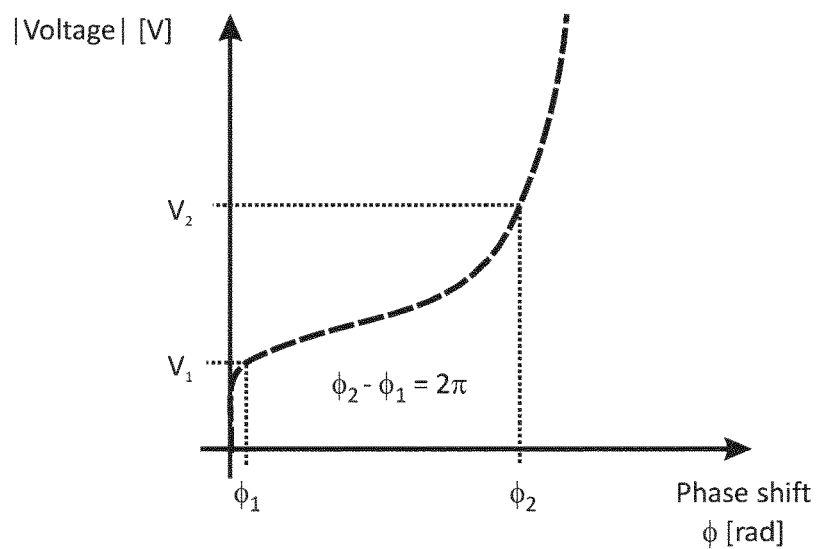
Figure 2C:
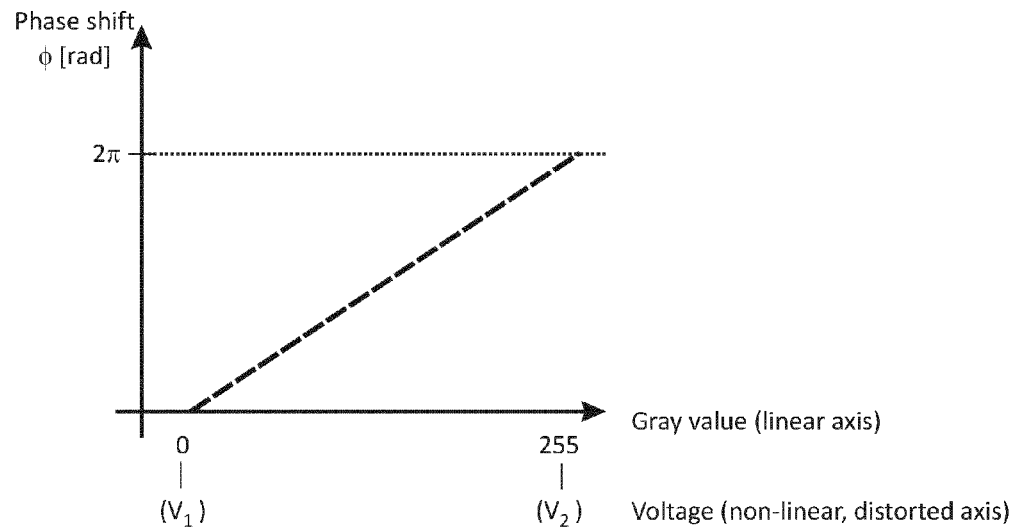

The proposed method for calibration of a controllable device for phase modulation of coherent light with a spatial light modulator device for generating a light distribution, whereby said controllable device comprises liquid crystal modulator cells arranged on a modulation matrix for modulating the phase of light passing through said liquid crystal modulator cells is depicted in FIGS. 2A to 2C:

FIG. 2A shows a graph of the generated phase shift values plotted versus the absolute voltage values of positive and negative polarity applied to for example a liquid crystal modulator cell. Thereby, the dashed line show phase shift values for positive voltages and the dashed-dotted line show phase shift values for negative voltages. As can be seen in FIG. 2A, although the absolute value $|V_1|$ is the same, applying $+V_1$ and $-V_1$ results in two different phase shift values differing by a phase offset $\Delta\phi$. Thus, applying $|V_1|$ in an inversion scheme would result in noisy phase response distribution similar to FIGS. 1A and 1B due to the unwanted phase offset $\Delta\phi$ for neighbouring liquid crystal modulator cells.

In summary, FIG. 2A shows a measurement for determining the polarity-dependent non-linear phase response of at least one liquid crystal modulator cell of a modulator matrix 10 of a spatial light modulator device in a controllable device according to the present invention. Thereby, the polarity-dependent non-linear phase response can be understood as a hysteresis curve, which is for example caused by a non-linearity in digital-to-analog converters of conventional display driver electronics.

In the next step, an inverse graph of FIG. 2A is generated as can be seen in FIG. 2B. In FIG. 2B, only the dashed line for the positive polarity is shown for simplification. Nevertheless, a set of applied voltage values in dependence on the measured phase shift for positive and negative voltage polarities is determined.

Furthermore, the inverse function of the measured curves for positive and negative polarities can be approximated by polynomial or analytic functions. Thereby, only parts of the inverse functions, which for example represent a $2\pi$-modulation range, have to be selected for polynomial or analytic fitting. It is preferable that regions of the curves are chosen, which are close to linear. As can be exemplarily seen in FIG. 2B, a phase shift interval $\phi_2-\phi_1=2\pi$ is chosen corresponding to voltage values $V_1$ and $V_2$.

Generally, for an equally-spaced phase range between $\phi_2-\phi_1=m\cdot 2\pi$, m being a real number, with predefined bit depth (e.g. 8 bit depth resulting in 256 phase shift values), the required voltages of positive and negative polarities for a distinct phase value may then be calculated by the calibration polynomial or analytic function and assigned to the distinct phase shift value, and saved in a storage unit, for example a look-up table. Alternatively, the coefficients of a polynomial function or parameters of an analytic function might be stored in a storage unit and the required voltages of positive and negative polarities for a distinct phase value might be calculated on demand.

Additionally, as can be seen in FIG. 2C, a second measurement may be accomplished for verification of the calibration and determination of its accuracy. Plotting the measured phase values over the non-equally spaced voltage values (not shown on the x-axis in FIG. 2C), should result in a linear curve for the phase shift values. Similar to FIG. 2B, only positive voltages in FIG. 2C are shown for simplification.

Concerning the relationship between measuring time and applied voltages according to an inversion scheme, there exist several possibilities how to further implement the calibration method according to the present invention:

First, the spatial light modulator could be continuously illuminated with a laser light source (cw-operation), while an inversion scheme based on a predetermined pattern is applied to the liquid crystal modulator cells. Thereby, the illumination and measurement time frame is larger than inversion frame rate. However, dependencies on voltages polarities are difficult to measure with this approach.

Moreover, the switching process of the liquid crystal molecules for reaching the desired nominal phase value is taken into account as well.

It might also be possible to carry out a measurement in a time resolving manner, where for example the light detection is carried out with a photodiode in dependence of time and is analysed using e.g. an oscilloscope or a suitable measurement and documentation system. From such a measurement, it is possible to determine the effective time frame in which the liquid crystals have their final orientation (i.e. a stable level). The times $t_{on}$ and $t_{off}$ can be determined with such a measurement as well.

Second, the spatial light modulator could be illuminated with a laser light source in time pulses, while an inversion scheme based on a predetermined pattern is applied to the liquid crystal modulator cells. Therefore, the phase shift measuring sensor(s) may only measure distinct polarity areas having the same polarity, which requires an exact spatial arrangement of the liquid crystal modulator cells and the sensor(s). Moreover, either the pulsed illumination or sensor has to be synchronized temporally with the inversion scheme.

This is explained exemplarily in the following for a chess-board inversion scheme:

A polarity area is driven in each odd frame with a negative voltage. The sensor is synchronized such that only a negative frame per applied voltage is measured or the sensor integrates a plurality of negative frames. The latter case may be accomplished by a synchronized data acquisition or a pulsed illumination, which is switched on only in odd frames. Concerning positive voltages, only even frames are measured as explained above. Thereby, two hysteresis curves as shown in FIG. 2A may be measured, which have to be assigned spatially (dependent on the polarity areas) and temporally (even or odd frame) to a liquid crystal modulator cell. These curves can be further processed as explained above in relation to FIGS. 2A to 2C in order to provide the desired exact phase response of a spatial light modulator.

Third, the spatial light modulator could be driven in a frame inversion scheme. Thereby, all liquid crystal modulator cells of the liquid crystal modulator matrix are alternately driven with a positive or a negative polarity for different frames. Thus, a calibration measurement for a positive frame is recorded and a calibration measurement for a negative frame is recorded as well. Thereby, it is possible to use a shorter integration time of the measurement sensor than the frame duration in order avoid measuring during the switching times $t_{on}$ and $t_{off}$.

Fourth, similar to the third case, a correct calibration is possible if a pulsed illumination is synchronized with inversion frames such that different calibration measurements for positively and negatively addressed frames may be recorded. Likewise, it is advantageous if the illumination time is shorter than the frame duration in order avoid measuring during the switching times $t_{on}$ and $t_{off}$.

Figure 3:
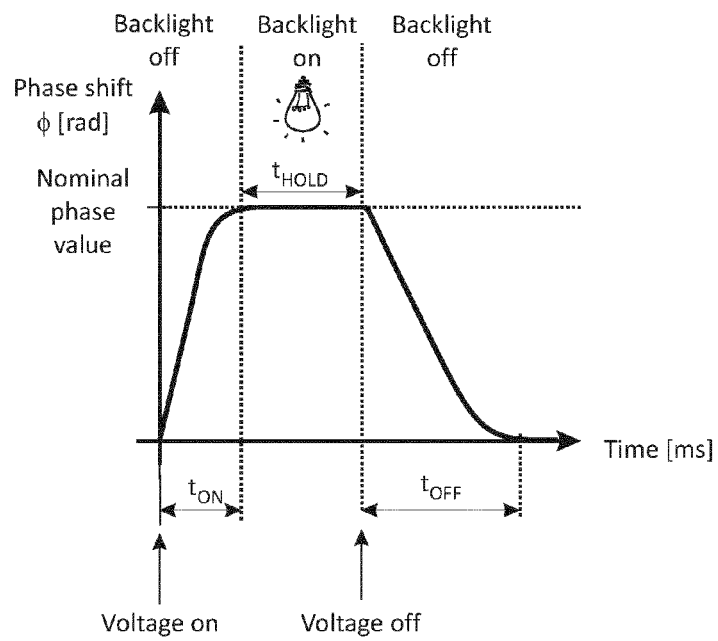
FIG. 3 shows a graph illustrating a time frame for accomplishing the method for calibration of a controllable device according to the present invention.

Said relationship between nominal phase value and switching times for the applied voltages and backlight illumination is exemplarily shown in FIG. 3: Thereby, the backlight illumination of the spatial light modulator and the phase shift measuring sensor are synchronized such that the backlight illumination illuminates the spatial light modulator only during the time frame where liquid crystal molecules have approached their final orientations within a required bit depth, which determine the nominal phase value. Consequently, the backlight is switched on after the time $t_{on}$, which is necessary for adjustment of the liquid crystal molecule orientations in the electric field, and switched off before the liquid crystal molecules return to their initial positions in the time $t_{off}$. Thereby, the measurement sensor only measures the phase response as long as the backlight is turned on. It is noted that the adjustment time of the liquid crystal molecule orientations in the electric field might depend on the position of a particular liquid crystal modulator cell on the modulator matrix.

In summary, it is possible to define in advance a plurality of different polarity areas (in detail the size, shape and position of the polarity areas on the liquid crystal modulator matrix according to a predetermined inversion scheme) and measure the corresponding phase response for a multitude of absolute voltage values in dependence on positive polarity and negative polarity as discussed in FIG. 2A. The thus acquired phase responses can be further processed as discussed in FIGS. 2B and 2C.

Concerning the controllable device for phase modulation of coherent light with a spatial light modulator device for generating a light distribution of the present invention, the above-discussed calibration may be accomplished according to the display type, in which the controllable device is included. Thus, the size, shape and position of the polarity areas on the liquid crystal modulator matrix according to a predetermined inversion scheme may be adapted to the display type, e.g. to a large sized home TV display or to a desktop monitor of a suitable size.

Moreover, it is possible to measure and calibrate in advance a multitude of different inversion schemes with their corresponding polarity areas differing in size, shape and positions. Consequently, the control unit of the controllable device may then dynamically adjust the inversion schemes and the corresponding the polarity areas, in particular their size, their position and their shape on the liquid crystal modulator matrix, according to the light distribution to be generated or the three-dimensional image content to be displayed.

In particular, if a 3D scene is presented using a sub-hologram 20 in dependence of the observer's eye location and the object to be reconstructed, the control unit can adapt the inversion scheme and the corresponding polarity area with a distinct size, shape and position according to the image content of the 3D scene.

Thereby, multiple sub-holograms 20 may also be superpositioned, whereby a single sub-hologram 20 may be generated by different polarity areas.

According to the present invention, the control unit adjusts the polarity area size and/or a polarity area position and/or a polarity area shape such that the length of intersection lines 30 between different polarity areas, in which one sub-hologram 20 is generated, is minimized. Thus, image quality deterioration due to the discussed phase offsets, which for example can still occur dynamically while presenting the specific 3D scene, can be further reduced.

In a preferred embodiment of the present invention, the control unit is further adapted to adjust the polarity area size and/or a polarity area position and/or a polarity area shape such that one sub-hologram 20 is generated within one single polarity area. Thereby, artifacts due to phase offsets can be prevented.

Figure 4A:
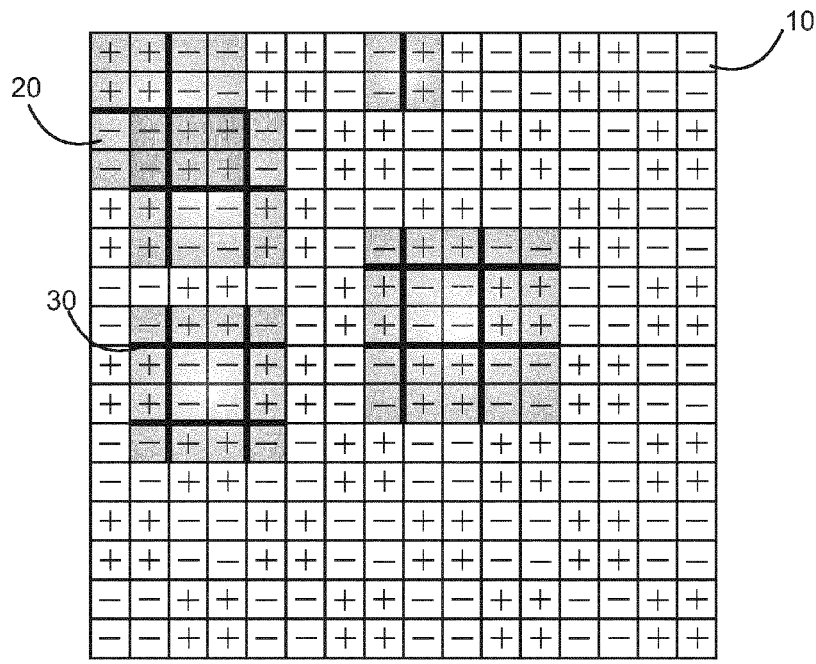
FIGS. 4A and 4B show a controllable device according to the present invention, whereby the liquid crystal modulator matrix generates the same sub-holograms by different polarity areas resulting in different intersection line lengths.
Figure 4B:
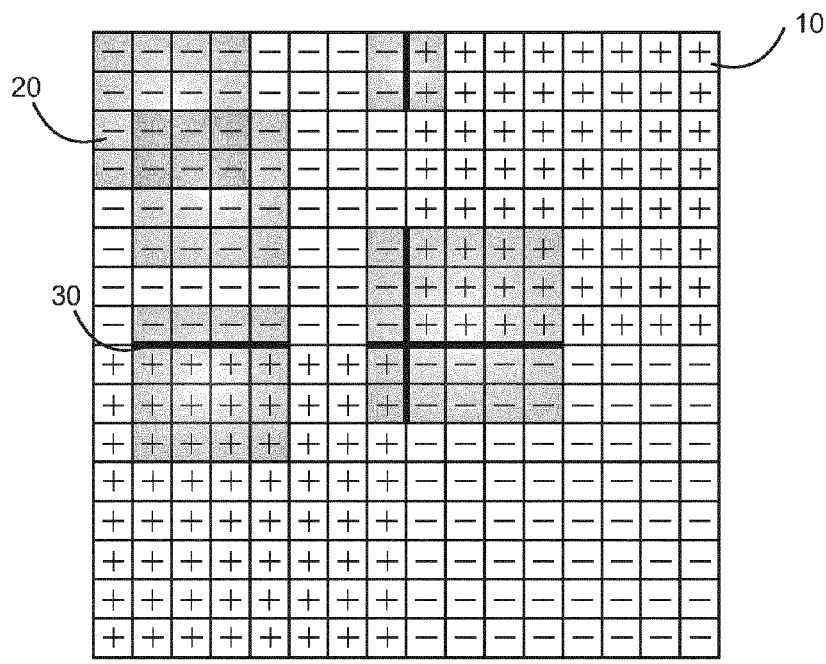

These scenarios are depicted in FIGS. 4A and 4B: FIG. 4A shows a fine chess-board pattern inversion scheme on a liquid crystal modulator matrix 10, whereas FIG. 4B shows a coarse grained chess-board pattern inversion scheme. Thereby, intersection lines 30 (thick black lines) that divide the sub-holograms 20 in areas, where positive and negative voltages are applied within one frame, are also shown. If the length sum of the intersection lines 30 is minimized, a potential error is at minimum, too. In best case, the sub-hologram 20 is not divided as shown in top left negative polarity area in FIG. 4B.

Note that a sub-hologram 20 can have the same size as the spatial light modulator size (as in classic holography) or smaller than the spatial light modulator size (as in SeeReal viewing window holography). Sub-holograms 20 have different sizes and positions on the spatial light modulator according to the 3D scene to be encoded; they can be overlapped without loss of information.

Minimizing the intersection line lengths 30 may lead to a frame inversion scheme in the controllable device for phase modulation of coherent light with a spatial light modulator device for generating a light distribution according to the present invention. Frame inversion as a driving scheme for a phase modulating liquid crystal displays can be useful if phase offsets $\Delta\phi$ still occur dynamically while presenting a specific 3D scene. However, it has to be noted that frame inversion requires an individual calibration of each liquid crystal modulator cell according to a positive frame and a negative frame. Thus, for the same phase value a distinct voltage pair of positive and negative polarity is assigned to each liquid crystal modulator cell.

Figure 5A:
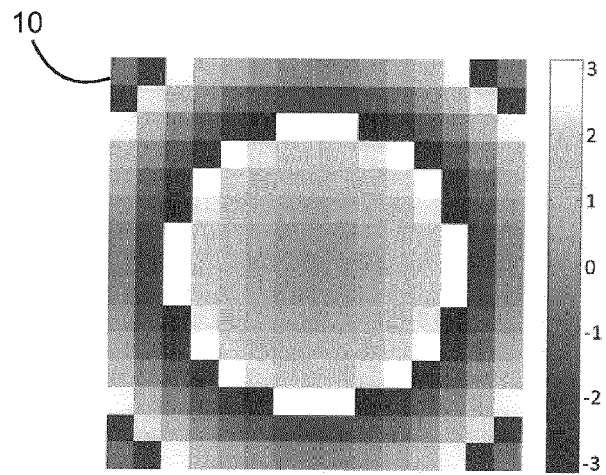
FIGS. 5A and 5B show the phase distribution of a liquid crystal modulator matrix according to the present invention, whereby the liquid crystal modulator matrix is driven by a frame inversion scheme.
Figure 5B:
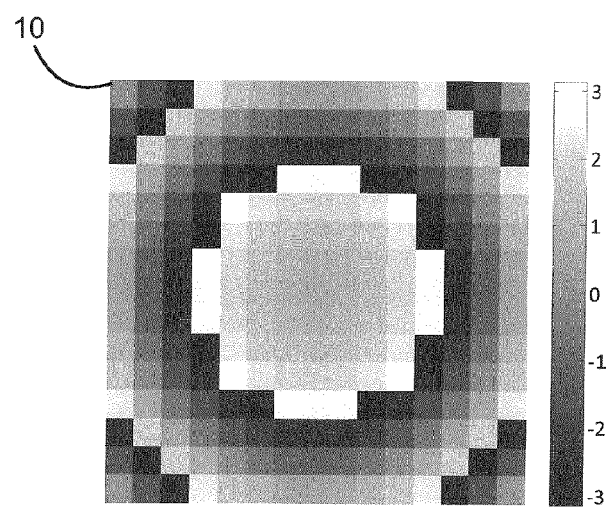

As an example, a controllable device according to the present invention is shown in FIGS. 5A and 5B, which is driven with a frame inversion scheme. FIG. 5A shows the phase distribution for an even frame and FIG. 5B shows the phase distribution for an odd frame, whereby in all frames the phase offset $\Delta\phi$, that may nevertheless occur, is added to the liquid crystal modulator cells. However, in this exemplary case, the phase difference between neighbouring pixels is reproduced correctly and due to the same polarity the phase offset is the same for al liquid crystal modulator cells. Therefore, the 3D scene reconstruction does not comprise artifacts because the deviations from the actual phase value to the nominal phase value are reduced or minimized.

If, however, liquid crystal modulator cells differ in their voltage-phase response locally on the liquid crystal modulator matrix 10, said differences are not taken into account and may nevertheless lead to a further phase offsets $\Delta\phi$. Thus, depending on the liquid crystal modulator matrix 10 and/or liquid crystal modulating cells, defining and calibrating smaller polarity areas as discussed above or shown in FIG. 4B, which take local differences between liquid crystal modulating cells into account, is recommendable.

With regard to the beam combiner as disclosed in WO 2010/149588, frame inversion may be applied as well: similar to the discussion in the background section, the phase of the first pixel is shifted to $\phi_1+\Delta\phi$ and the phase of the second pixel is shifted to $\phi_2+\Delta\phi$ in the same direction if a phase offset $\Delta\phi$ still occurs. Consequently, the amplitude in a frame inversion scheme is unchanged, namely $$\cos\left(\frac{\phi_1 - \phi_2}{2}\right).$$

However, the phase value changes to $$\frac{\phi_1 + \phi_2 + 2\Delta\phi}{2}.$$

However, for neighbouring complex pixels making up parts of several overlapping lens functions, the phase shift of each complex pixel is then again equivalent to a phase offset of the lens functions and does in this case not affect the 3D scene reconstruction of the hologram.

Generally, it has to be noted that the above embodiments have been described as described in relation to phase modulating liquid crystal displays in 3D scene reconstruction. However, the controllable device of the present invention may also be applied in optical tweezers or in general for aberration correction as well. Moreover, the controllable device may be used in general applications of dynamic holography using computer-generated holograms, such as holographic projections, digital holography, maskless lithography, optical filtering, beam splitting and shaping, holographic memory, holographic recording and security systems, phase shifting and coherent wavefront modulation and aberration correction, and laser pulse modulation or for computer-generated holograms (CGH) as described in WO 2006/116965.

The invention claimed is:

1. A controllable device for phase modulation of coherent light with a spatial light modulator device for generating a light distribution, comprising:
   a modulator matrix having a plurality of liquid crystal modulator cells each being adapted to modulate a phase value of light passing through said liquid crystal modulator cell depending on a voltage, which is applied to said liquid crystal modulator cell;
   at least one polarity area of said modulator matrix including at least one liquid crystal modulator cell;
   at least one voltage value storage memory storing at least one pair of voltage values of which one has a positive and the other has a negative polarity for said liquid crystal modulator cells, whereby said pair of voltage values corresponds to a predetermined phase value; and
   a voltage controller selectively applying one pair of voltage values to one liquid crystal modulator cell, whereby said voltage controller applies alternately said voltage values of positive or negative polarity according to an inversion scheme such that voltages applied to one polarity area have the same polarity;
   whereby at least one of:

the size of the polarity areas is predetermined in advance according to a display type, in which the controllable device is included or;

the light distribution to be generated is defined by at least one sub-hologram and the voltage controller adjusts at least one of the polarity area size and a polarity area position and a polarity area shape such that the length of intersection lines between different polarity areas, in which one sub-hologram is generated, is minimized.

2. The controllable device according to claim 1, whereby the voltage value storage memory stores pairs of voltage values for distinct phase values or for a predetermined phase interval with distinct phase values.

3. The controllable device according to claim 1, whereby the voltage controller further dynamically adjusts at least one of said polarity area size and a polarity area position and/or a polarity area shape according to the light distribution to be generated.

4. The controllable device according to claim 1, whereby the voltage controller further adjusts at least one of the polarity area size and a polarity area position and a polarity area shape such that one sub-hologram is generated within one single polarity area.

5. The controllable device according to claim 1, whereby the voltage controller applies said pairs of voltage values to said liquid crystal modulator cells according to at least one of a line inversion scheme, a row inversion scheme, a dot inversion scheme, a chess-board inversion scheme, an arbitrary patterned inversion scheme and a frame inversion scheme for said polarity areas.

6. The controllable device according to claim 1, whereby said one pair of voltage values for one phase value is predetermined in advance for a single liquid crystal modulator cell or one polarity area including a plurality of liquid crystal modulator cells in dependence on at least one of the polarity of the voltage value, the absolute value of the voltage, the size of the polarity area, the position of the liquid crystal modulator cell or the polarity area in the modulator matrix, and the time frame of the nominal phase value.

7. The controllable device according to claim 1, comprising a plurality of voltage value storage memories selectively storing voltage values for at least one positive polarity, negative polarity, a liquid crystal modulator cell and a polarity area.

8. The controllable device according to claim 1, further comprising an illumination unit for illuminating the spatial light modulator device with light, the illumination unit comprises a pulsed illumination or a predetermined illumination function, wherein the pulsed illumination or the predetermined illumination function of the illumination unit is synchronized with the operation of the spatial light modulator device or with the inversion scheme of the spatial light modulator device.

9. A display comprising a controllable device according to claim 1, wherein the display is designed such that at least one of the following is presentable: two-dimensional image content and stereoscopic image content and/or stereoscopic multi-view image content and holographic image content.

10. A method for operating a controllable device according to claim 1, whereby the voltage controller selectively applies one pair of voltage values to one liquid crystal modulator cell, whereby said voltage controller applies alternately said voltage values of positive or negative polarity according to an inversion scheme such that voltages applied to one polarity area have the same polarity.

* * * * *